(12) United States Patent
Robb

(10) Patent No.: US 6,460,434 B2
(45) Date of Patent: Oct. 8, 2002

(54) MACHINING ASSEMBLY AND A METHOD

(76) Inventor: Stewart Robb, Nether Balgbrogie, Kinellar, Aberdeen (GB), AB21 0RX ( * ) Notice: Subject to any disclaimer, the term of this patent is extended or adjusted under 35 U.S.C. 154(b) by 0 days.

(21) Appl. No.: 09/381,873

(22) PCT Filed: Mar. 26, 1998

(86) PCT No.: PCT/GB98/00928
§ 371 (c)(1),
(2), (4) Date: Sep. 24, 1999

(87) PCT Pub. No.: WO98/42470
PCT Pub. Date: Oct. 1, 1998

(65) Prior Publication Data
US 2002/0053265 A1 May 9, 2002

(30) Foreign Application Priority Data

Mar. 26, 1997 (GB) .............................. 9706279

(51) Int. Cl.$^7$ ................................ B23B 1/00
(52) U.S. Cl. ............................ 82/1.11; 82/1.4; 82/118
(58) Field of Search .................. 82/1.11, 113, 1.4, 82/72, 93, 56, 58, 59, 118, 129, 130

(56) References Cited

U.S. PATENT DOCUMENTS

| 3,851,564 | A | | 12/1974 | Kitano | 90/11.52 |
| 4,161,127 | A | | 7/1979 | Tiffin | 82/1.4 |
| 4,752,159 | A | | 6/1988 | Howlett | 408/14 |
| 4,854,200 | A | * | 8/1989 | Mynhier | 82/113 X |
| 4,944,639 | A | | 7/1990 | Washington | 408/176 |
| 5,182,974 | A | * | 2/1993 | Cudini et al. | 82/124 |
| 5,417,130 | A | * | 5/1995 | Dorsch | 82/1.11 |
| 5,778,744 | A | * | 7/1998 | Braun et al. | 82/1.11 |
| 5,836,727 | A | * | 11/1998 | Scheer | 82/113 X |

FOREIGN PATENT DOCUMENTS

| EP | 0064766 | * | 11/1982 | 82/129 |
| EP | 0 391 051 A2 | | 10/1990 | |
| FR | 2 374 120 | | 7/1978 | |
| GB | 1 571 634 | | 7/1980 | |
| JP | 406000702 A | * | 1/1994 | 82/129 |
| JP | 406134602 A | * | 5/1994 | 82/129 |

* cited by examiner

Primary Examiner—Henry Tsai
(74) Attorney, Agent, or Firm—Drinker Biddle & Reath LLP

(57) ABSTRACT

A machining assembly and a method of cutting a tubular member is described which includes a cutting tool and a tubular member holder, wherein the linear and rotational displacement of the cutting tool and the tubular member are controlled with respect to each other by two independent mechanisms. The assembly further includes a third mechanism for controlling the radial displacement of the cutting tool with respect to a longitudinal axis of the tubular member.

18 Claims, 2 Drawing Sheets

MACHINING ASSEMBLY AND A METHOD

BACKGROUND OF THE INVENTION

This invention relates to a machining assembly and a method of cutting a tubular member.

Conventionally, machining assemblies for machining the ends of tubular members such as pipes comprise a tubular member clamping housing into which the tubular member to be machined is clamped, and a machining housing which includes the cutting tool which machines the tubular member. In order for the tubular member to be machined, the machining housing and the clamping housing are moveable relative to one another, and usually, the movement relative to one another is controlled by a computer numerically controlled (CNC) system.

A portable machining assembly is known that provides a machining capability for the tubular member ends at the location where the tubular members are used, for example on a drilling or production onshore or offshore rig. An example of such a portable machining assembly is shown in British Patent No 2209983. This portable machining assembly has a clamping housing which clamps the tubular member in a stationary position. A machining housing is moveable in a longitudinal, and rotational direction with respect to the longitudinal axis of the tubular member, and the cutting tool, which is mounted to the machining housing, is additionally moveable in a radial direction with respect to the longitudinal axis of the tubular member. Both the longitudinal and the rotational movement of the machining housing are provided by a single motor. The motor directly drives the rotational movement of the machining housing through an intermeshing gearwheel arrangement which results in the rotational movement of the machining housing being directly fixed to the output of the motor. The longitudinal movement of the machining housing is provided through a gearbox which is selectively connectable with the machining housing. Therefore, when the motor is operating, the machining housing rotates and when longitudinal movement of the machining housing is required, the power output of the gearbox is engaged with the machining housing.

BRIEF SUMMARY OF THE INVENTION

According to the present invention there is provided a machining assembly comprising a body member, and a tubular member holder for holding a tubular member;

the body member comprising a cutting tool for cutting the tubular member, the cutting tool and the tubular member being linearly moveable with respect to each other by a linear displacement mechanism, and rotationally moveable with respect to each other by a rotational movement mechanism;

the rotational movement mechanism and the linear displacement mechanism being operable by respective first and second power means, the first and second power means being controlled independently of each other, so that rotational and linear movement of the cutting tool are independent from one another.

Typically, the first and second power means comprise first and second motors.

Typically, the machining assembly further comprises a stationary housing, and preferably, the tubular member holder is secured to the stationary housing.

Typically, the body member is coupled to the stationary housing by a linearly moveable bearing arrangement.

Typically, the cutting tool and the tubular member are linearly moveable with respect to a longitudinal axis of the tubular member.

Preferably, the linear displacement mechanism comprises a screw-threaded shaft mounted on one of the stationary housing and the body member, and which is coupled to the output of the second motor, and a screw-threaded member that co-operates with the screw-threaded shaft, the screw-threaded member being mounted on the other of the stationary housing or the body member.

Typically, the screw-threaded member comprises a nut.

Preferably, the screw-threaded shaft is mounted on the stationary housing where the longitudinal axis of the screw-threaded shaft is parallel to the longitudinal axis of the tubular member.

Typically, the screw-threaded member is mounted on the body member wherein actuation of the second motor rotates the screw-threaded shaft which facilitates linear movement of the screw-threaded member.

Typically, movement of the screw-threaded member facilitates linear movement of the body member.

Typically, the body member includes a drive shaft which is rotatably mounted within the body member. Typically, a first end of the drive shaft is coupled to the first motor, and a second end of the drive shaft is coupled to the cutting tool.

Preferably, the cutting tool is moveable in a radial direction with respect to the longitudinal axis of the tubular member by a radial displacement mechanism.

According to a second aspect of the present invention there is provided a method of cutting a tubular member comprising supporting a tubular member with a tubular member holder;

providing a cutting tool;

providing for linear displacement of one of the tubular member and the cutting tool with respect to the other;

providing for rotational movement of one of the tubular member and the cutting tool with respect to the other; and the linear displacement and rotational movement being independent of one another by use of a first and second independent power means.

Typically, actuation of the first independent power means moves one of the tubular member and the cutting tool along a longitudinal axis of the tubular member, such that the cutting tool is capable of cutting the tubular member.

Actuation of the first power means in one rotational direction typically moves the cutting tool and the tubular member linearly towards one another, and actuation of the first power means in the other direction typically moves the tubular member and the cutting tool linearly away from one another.

Typically, actuation of the second independent power means rotates one of the tubular member and the cutting tool in a clockwise direction with respect to the other.

The method may additionally comprise the step of providing for radial displacement of the cutting tool with respect to a longitudinal axis of the tubular member by use of a third independent power means.

BRIEF DESCRIPTION OF THE DRAWINGS

An embodiment of the present invention will now be described, by way of example only, with reference to the accompanying drawings, in which.

DETAILED DESCRIPTION OF THE INVENTION

Figure 1:
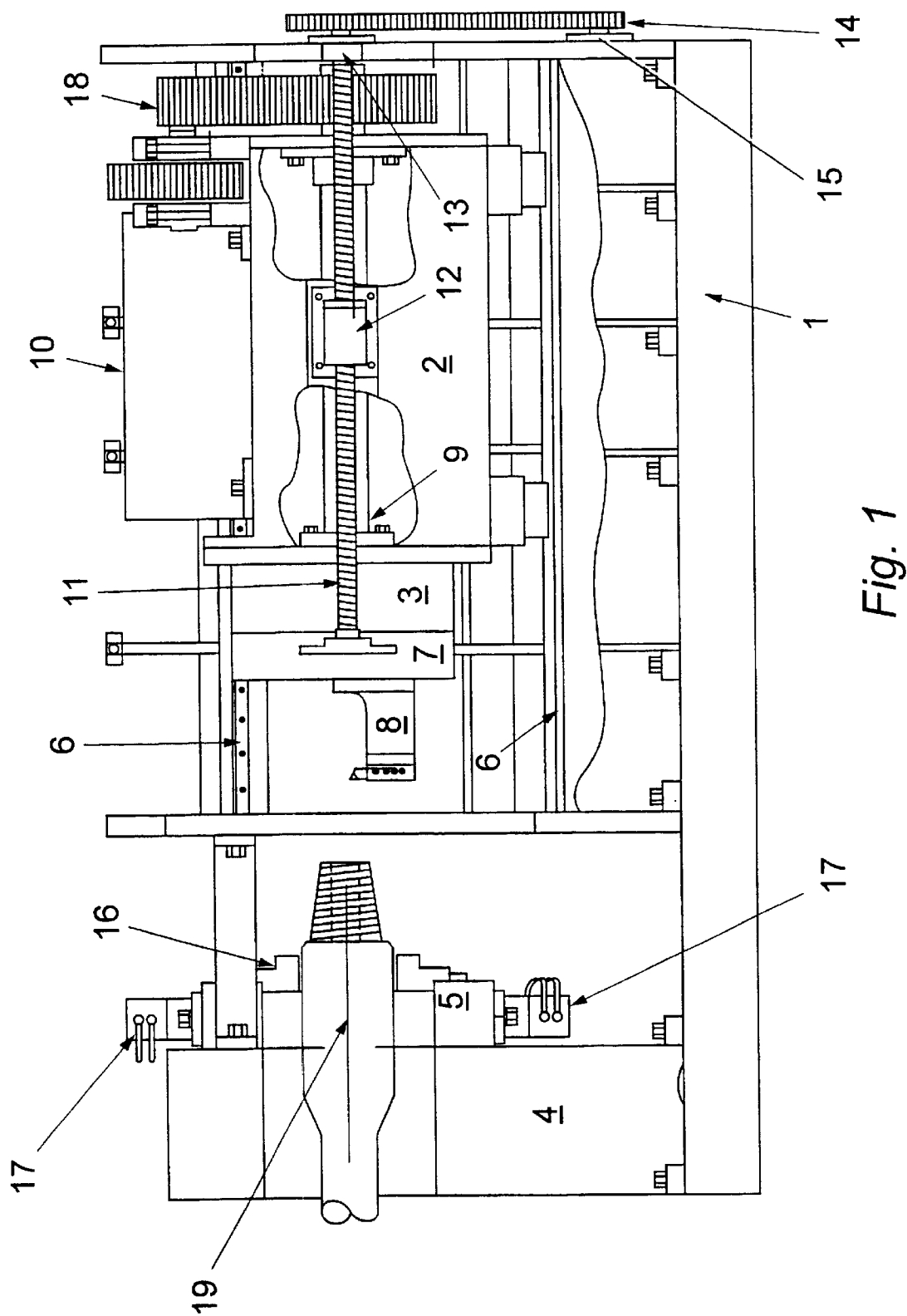
FIG. 1 is a schematic side view of a machining assembly in accordance with the present invention.
Figure 2:
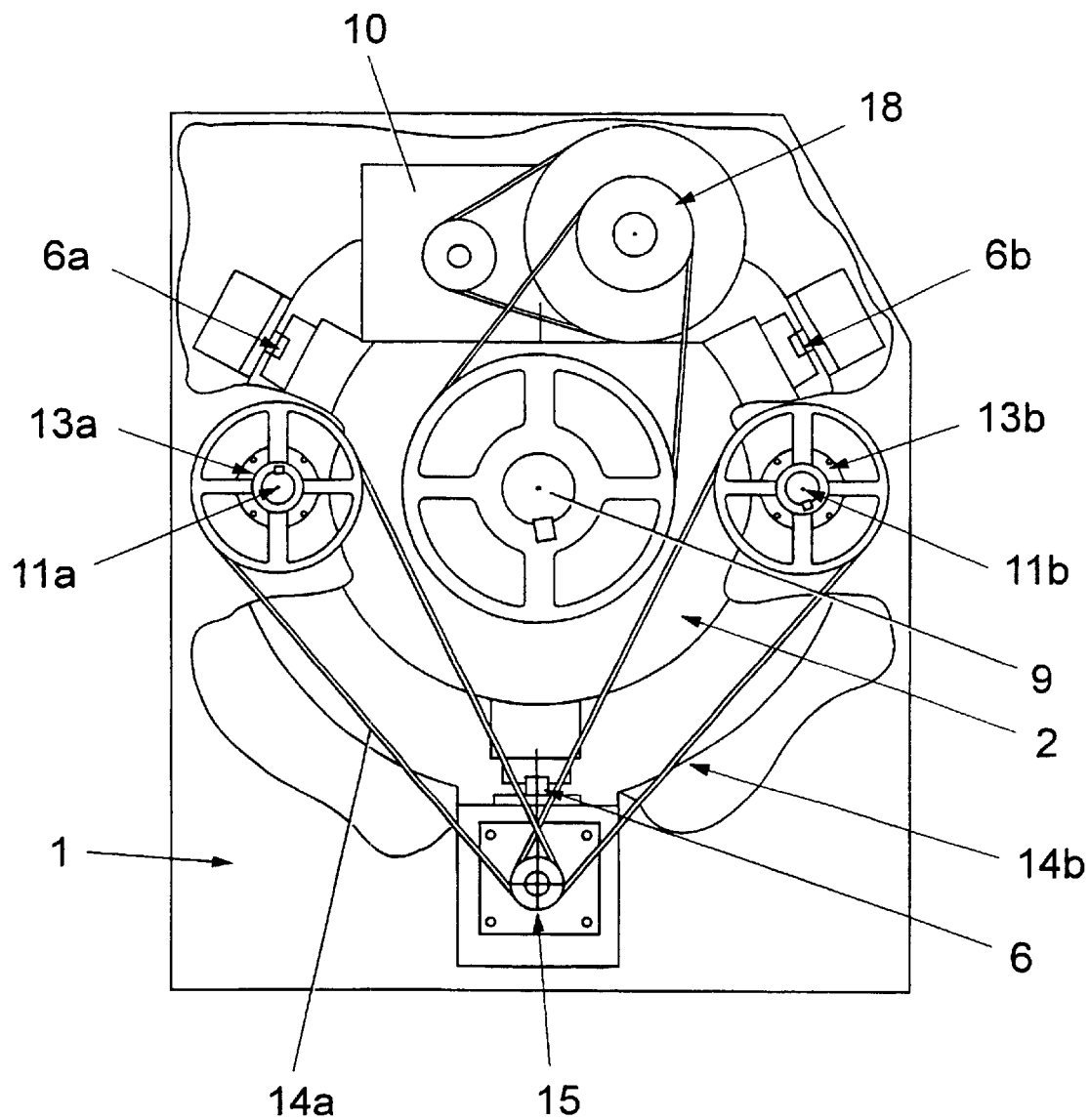
FIG. 2 is an end view of the machining assembly of FIG. 1.

FIG. 1 shows a machining assembly comprising a body member or machining housing 2 and a tubular member holder or clamping housing 4, 5. The clamping housing 4, 5 is secured to a stationary housing 1 to form an integrated assembly to ensure that a tubular member held in the clamping housing 4, 5 remains rigid during cutting.

A tubular member 19, which in this case is a pipe for use in the hydrocarbon exploration and exploitation industry, is inserted into the tubular member entrance 4 of the clamping housing 4, 5. FIG. 1 shows only one end of the pipe 19, this end having a tapered male end pin connection which requires to have either a male tapered screw-thread refurbished or formed.

The end of the pipe 19 is held within the pipe entrance 4 by a clamp arrangement of the clamping housing 4, 5, the clamp arrangement comprising four jaw chucks 16. Each jaw chuck 16 is controlled by a hydraulic motor 17 to enable efficient and secure alignment of the pipe 19 so that the longitudinal axis of the pipe 19 is parallel to the longitudinal axis of the machining housing 2.

The machining housing 2 is typically cylindrical and is mounted within the stationary housing 1 by three equi-spaced moveable linear bearings 6 such that the machining housing 2 is secured coaxially within the stationary housing 1, but is moveable in a linear direction by means of the bearings 6. It will be appreciated that the bearings 6 need not be equi-spaced and any suitable configuration may be used.

The linear movement of the machining housing 2 toward and away from the clamping housing 4, 5 and hence the pipe 19, is controlled by a linear displacement mechanism. The linear displacement mechanism comprises a CNC servo-drive motor 15 which is secured to the stationary housing 1. The rotational output of the servo-drive motor 15 is coupled to two timing belt drives 14a, 14b which are respectively coupled to two screw-threaded shafts 11a, 11b. The respective ends of the screw-threaded shafts 11a, 11b are secured to the stationary housing 1 by thrust bearings 13a, 13b. The screw-threaded shafts 11a, 11b are located laterally at either side of the machining housing 2. An internally threaded nut 12 is secured to either side of the machining housing 2, and the internal bore of the nut 12 is threadedly engaged with the respective screw-threaded shafts 11a, 11b.

Actuation of the servo-drive motor 15 causes the two timing-belt drives 14a, 14b to rotate, which rotates the screw-threaded shafts 11a, 11b. This in turn moves the two nuts 12, and hence the machining housing 2, in a linear direction either toward or away from the pipe 19, depending on the direction of rotation of the servo-drive motor 15.

Mounted to the machining housing 2 at its nearest end to the pipe 19 is a cutting tool 8 for cutting the pipe 19. The cutting tool 8 is rotatably mounted on the machining housing 2 by a rotatable facing head 7. An example of a suitable facing head 7 is a UTRONIC (™) series 5-500S electronic CNC facing head manufactured by D'Andrea SpA of Milan, Italy.

The facing head 7 includes a tool slide (not shown) which couples the cutting tool 8 to the facing head 7, so that the cutting tool 8 may be moved radially with respect to the longitudinal axis of the machining housing 2. Thus the radial displacement of the cutting tool 8 may be increased or decreased whilst the facing head 3 is rotating.

The rear portion of the rotatable facing head 7 is coupled to one end of a rotatable central bearing (not shown) of a stationary bearing housing 3. The stationary bearing housing 3 is secured to one end of the machining housing 2 and remains stationary with respect thereto, whilst the central bearing is rotatable with respect to the stationary bearing housing 3. Also mounted within the stationary bearing housing 3 is a third motor (not shown), the output of which is coupled to the tool slide. Actuation of the third motor actuates the tool slide to vary the radial displacement of the cutting tool 8. An example of a suitable motor is a BOSCH (™) motor, reference no. SE-B2.020.060.

The other end of the central bearing is coupled to one end of the drive shaft 9, the drive shaft 9 being located co-axial with the longitudinal axis of the machining housing 2. The other end of the drive shaft 9 is connected to a belt-drive reduction system 18. The reduction system 18 is connected to the output of a main spindle motor 10 which is secured to the machining housing 2. When the main spindle motor 10 is actuated it causes rotation of the drive shaft 9 through the belt-drive reduction system 18. This then rotates the central bearing thereby rotating the facing head 7, and thus the cutting tool 8.

Therefore, the machining housing 2 of the machining assembly comprises a linear displacement mechanism, a rotational movement mechanism and a radial displacement mechanism. There is thus a direct linear relationship between the outputs of the servo-drive motor 15, facing head 7 and tool slide and the respective magnitudes of movements of the linear displacement mechanism, rotational movement mechanism and the radial displacement mechanism.

By controlling the rotation of the facing head 7, the radial displacement of the cutting tool 8 by actuation of the tool slide whilst the cutting tool 8 is rotating, and the axial displacement of the machining housing 2 by CNC control, the machining assembly can generate any profile required on a stationary workpiece followed by any thread form on the profiled surface. Use of two independent motors allows the rotational movement and linear displacement of the cutting tool 8 to be completely independent. This allows for more accurate and precise control of the cutting tool 8 and thus an improved profile and/or screw-thread.

As shown in FIG. 1, the tubular member or pipe end 19 is a male pin connection, but it will be understood by the reader that a female box connection can equally be profiled and threaded.

Modifications and improvements may be made to the foregoing embodiment without departing from the scope of the invention.

I claim:

1. A machining assembly comprising a body member, and a tubular member holder for holding a tubular member having a longitudinal axis, wherein the tubular member is held stationary by the tubular member holder such that the longitudinal axis of the tubular member is horizontal;

the body member comprising a moveable cutting tool for cutting the tubular member, the cutting tool being linearly moveable with respect to the tubular member by a pair of linear displacement mechanisms, said linear movement being along an axis parallel to the horizontally arranged longitudinal axis of the tubular member, and rotationally moveable with respect to the tubular member by a rotational movement mechanism;

the rotational movement mechanism and the pair of linear displacement mechanisms being operable by actuation of respective first and second power means, the first and second power means being actuable independently of each other, so that the pair of linear displacement mechanisms and the rotational movement mechanism are independent from one another; wherein one linear displacement mechanism is provided at each side of the body member, and wherein the said pair of linear displacement mechanisms and the cutting tool are all aligned on the same horizontally arranged plane.

2. A machining assembly as claimed in claim 1, wherein the first and second power means comprise respective first and second motors.

3. A machining assembly as claimed in claim 1, further comprising a stationary housing.

4. A machining assembly as claimed in claim 3, wherein the tubular member holder is secured to the stationary housing.

5. A machining assembly as claimed in claim 3 or 4, wherein the body member is coupled to the stationary housing by a linearly moveable bearing arrangement.

6. A machining assembly as claimed in claim 3, wherein the first and second power means comprise respective first and second motors and each of said linear displacement mechanism comprises a screw-threaded shaft mounted on one of the stationary housing and the body member, and which is coupled to the output of the second motor, and a screw-threaded member that co-operates with the screw-threaded shaft, the screw-threaded member being mounted on the other of the stationary housing and the body member.

7. A machining assembly as claimed in claim 6, wherein the screw-threaded member comprises a nut.

8. A machining assembly as claimed in claim 6, wherein the screw-threaded shaft is mounted on the stationary housing where the longitudinal axis of the screw-threaded shaft is parallel to the longitudinal axis of the tubular member.

9. A machining assembly as claimed in claim 6, wherein the screw-threaded member is mounted on the body member wherein actuation of the second motor rotates the screw-threaded shaft which facilitates linear movement of the screw-threaded member.

10. A machining assembly as claimed in claim 6, wherein movement of the screw-threaded member facilitates linear movement of the body member.

11. A machining assembly as claimed in claim 1, wherein the rotational movement mechanism further comprises a drive shaft which is rotatably mounted within the body member.

12. A machining assembly as claimed in claim 7, wherein a first end of the drive shaft is coupled to the first motor, and a second end of the drive shaft is coupled to the cutting tool.

13. A machining assembly as claimed in claim 1, wherein the cutting tool is further moveable in a radial direction with respect to the longitudinal axis of the tubular member by a radial displacement mechanism.

14. A method of cutting a tubular member comprising supporting a tubular member having a longitudinal axis with a tubular member holder wherein the tubular member is held stationary by the tubular member holder such that the longitudinal axis of the tubular member is horizontal;

providing a moveable cutting tool;

providing for linear displacement of the cutting tool with respect to the tubular member in the form of a pair of linear displacement mechanisms wherein one linear displacement mechanism is provided at each side of the body member, said linear movement being along an axis parallel to the horizontally arranged longitudinal axis of the tubular member and wherein the said pair of linear displacement mechanisms and the cutting tool are all aligned on the same horizontally arranged plane;

providing for rotational movement of one of the tubular member and the cutting tool with respect to the other; and the linear displacement and rotational movement being independent of one another by use of a first and second independent power means.

15. A method according to claim 14, wherein actuation of the first independent power means moves one of the tubular member and the cutting tool along a longitudinal axis of the tubular member, such that the cutting tool is capable of cutting the tubular member.

16. A method according to claim 14, wherein actuation of the first independent power means in one rotational direction moves the cutting tool and the tubular member linearly towards one another, and actuation of the first independent power means in the other direction moves the tubular member and the cutting tool linearly away from one another.

17. A method according to claim 14, wherein actuation of the second independent power means rotates one of the tubular member and the cutting tool in a clockwise direction with respect to the other.

18. A method according to claim 14, further comprising providing for radial displacement of the cutting tool with respect to a longitudinal axis of the tubular member by use of a third independent power means.

* * * * *